Oct. 16, 1923.

L. SAUER

EGG BEATER AND CREAM WHIP

Filed Sept. 30, 1921    2 Sheets-Sheet 1

1,470,882

Lena Sauer
INVENTOR

BY Victor J. Evans
ATTORNEY

WITNESS:
E. R. Ruppert

Oct. 16, 1923.                                                                                1,470,882
                              L. SAUER
                     EGG BEATER AND CREAM WHIP
                     Filed Sept. 30, 1921        2 Sheets-Sheet 2
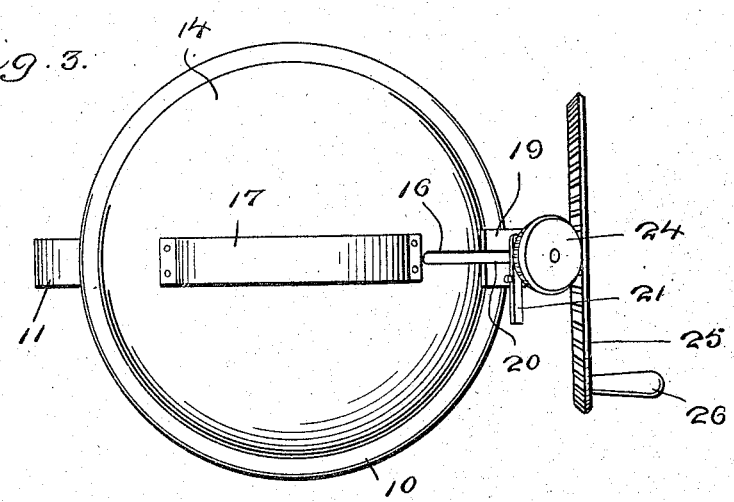
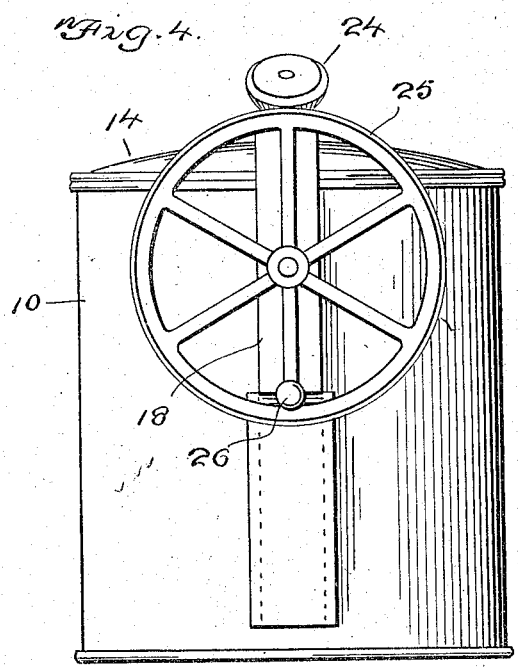
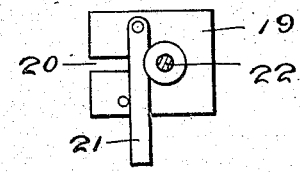
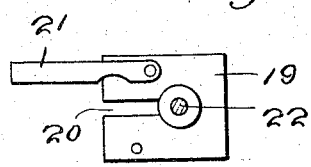
Lena Sauer
INVENTOR
BY Victor J. Evans
ATTORNEY
WITNESS:

Patented Oct. 16, 1923.

1,470,882

UNITED STATES PATENT OFFICE.

LENA SAUER, OF HAMILTON, OHIO.

EGG BEATER AND CREAM WHIP.

Application filed September 30, 1921. Serial No. 504,523.

*To all whom it may concern:*

Be it known that I, LENA SAUER, a citizen of the United States, residing at Hamilton, in the county of Butler and State of Ohio, have invented new and useful Improvements in Egg Beaters and Cream Whips, of which the following is a specification.

This invention relates to culinary implements, particularly to devices for beating eggs and whipping cream and the like, and has for its object the provision of a novel device for this purpose which includes a specially made receptacle within which operates a specially constructed beater element, efficient operating means being provided for imparting rotary movement to the beater element.

An important and more specific object is the provision of a device of this character in which the beater member is readily separable from and removable with respect to the receptacle so that the parts may be cleaned and so that the material to be beaten may be easily disposed within the device.

Another object is the provision of a device of this character in which the receptacle is provided with a slotted lid into the slot of which may be moved the beater member so as to disengage the latter from its ordinary support.

An additional object is the provision of a device of this character which will be simple and inexpensive in manufacture, highly efficient in use, rapid in operation, durable in service and a general improvement in the art.

With the above and other objects and advantages in view, the invention consists in the details of construction to be hereinafter more fully described and claimed, and illustrated in the accompanying drawings in which, Figure 1 is a side elevation of my device, Figure 2 is a vertical longitudinal sectional view therethrough, Figure 3 is a plan view.

Figure 4 is a view, taken at right angles to Figure 1.

Figure 5 is a detail plan view of the supporting bearing brackets showing the same in closed position and Figure 6 is a similar view showing it in open position.

Figure 1:
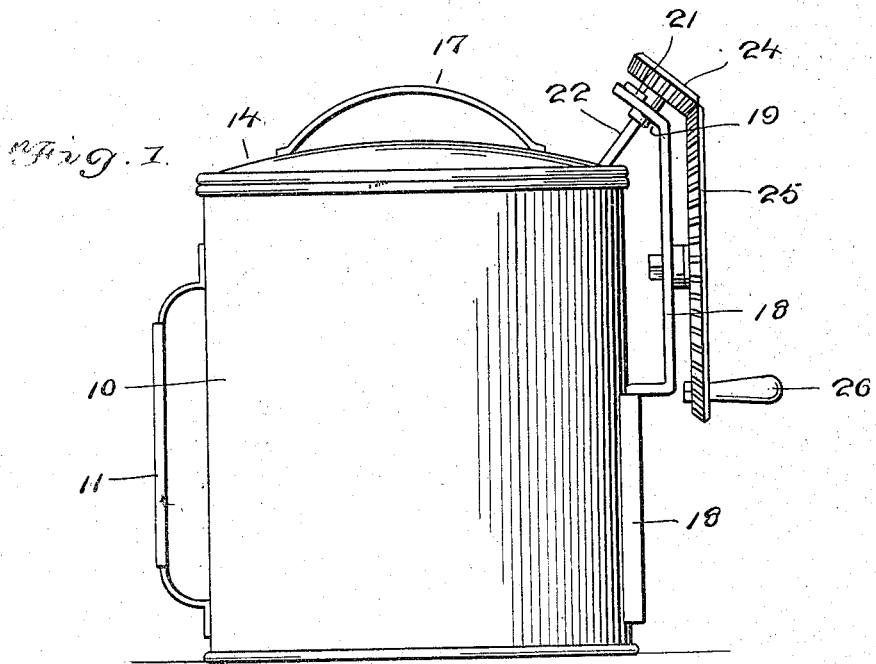
Figure 2:
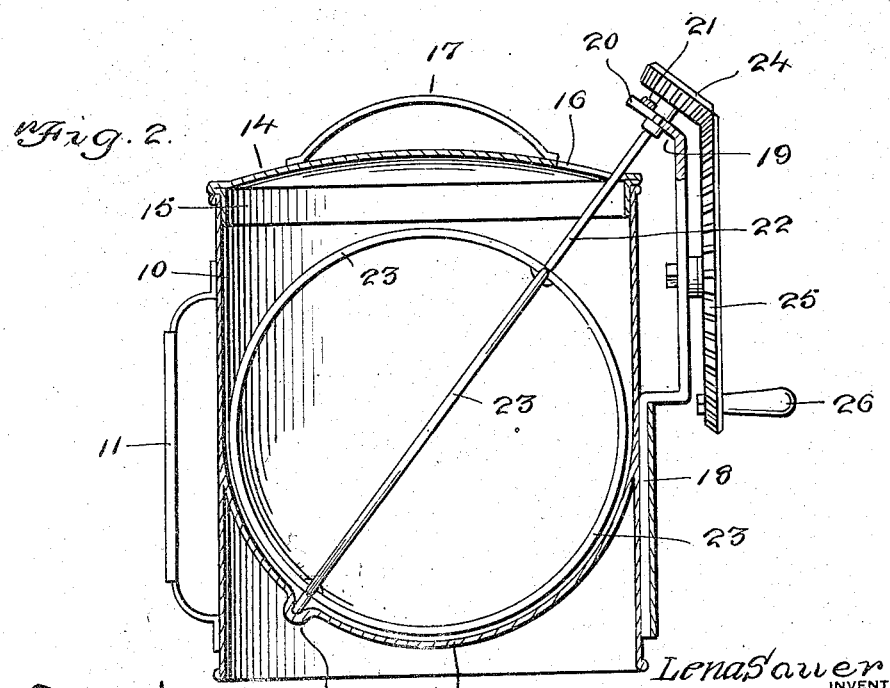

Referring more particularly to the drawings I have shown my device as comprising a cylindrical receptacle 10, formed of any suitable material such as sheet metal, and provided at one side with a handle 11. Disposed interiorly of this receptacle 10 is a false bottom 12 which is of substantially semi-spherical form and which is formed at one side of its center with a depression 13 constituting a bearing. Disposable upon the top of this receptacle 10 is a suitable cap or cover 14 having flanges 15 adapted to fit within the top of the receptacle 10 and formed with a slot 16 for a purpose to be described. This cover may be formed with any suitable handle 17 whereby it may be placed upon or removed from the receptacle conveniently.

Detachably secured upon the side of the receptacle 10 through the instrumentality of the sleeve 18' which is disposed diametrically opposite the handle 11 is a metal strip 18 extending upwardly along the side of the receptacle in somewhat spaced relation thereto and having its upper end angularly inclined as indicated at 19 and formed with a slot 20. Disposed upon this angular end is a spring 21 which is movable to extend transversely of the slot when desired and is engageable with a pin 21' carried by said angular upper end 19.

Associated with this receptacle and cover is a beater member which includes a spindle 22 which has its lower end adapted to be engaged within the depression 13 and which is provided intermediate its ends with a plurality, preferably four, beater arms 23 of semi-circular shape such as is commonly used in egg beaters of ordinary type. The upper portion of this spindle 22 is adapted to be disposed within the slot 16 of the cover and also within the slot 20 of the angular end of the bracket member 18. The upper extremity of the spindle 22 carries a pinion 24 which is adapted to mesh with a gear 25 rotatably mounted upon the upper portion of the bracket 18 and provided with a suitable knob or handle 26.

The operation of the device is as follows:

The operator engages the lower end of the shaft or spindle 22 within the depression 13 in the false bottom 12 of the receptacle and then pours into the receptacle the eggs or other material to be beaten. It is of course conceivable that if preferred the material might be poured into the receptacle first and then the beater member may be inserted afterward, though it will be apparent that the first mentioned method is preferable. After the material has been placed within the receptacle, the cover 14 is engaged thereon and pressed down into place so as to close the top of the receptacle, it being noted that the slot 16 in the cover provides accommodations for the spindle 22. The beater member is then moved laterally, that is along the slot 16 of the cover, until its upper portion can be engaged within the slot 20 in the angular end 19 of the bearing bracket 18 whereupon the pinion 24 at the upper end of the spindle will be in mesh with the gear 25 journaled on the bracket member 18. The operator then moves the spring 21 to extend across the slot 20 so that the beater member will be incapable of lateral movement but will be fully capable of rotation. When the operator grasps the knob or handle and rotates the relatively large gear it will be quite apparent that the intermeshing of this large gear with the pinion 24 will cause the beater member to be rotated rapidly so that the beater arms 23 thereof will effectively churn up or beat the eggs or other material within the receptacle.

From the foregoing description and a study of the drawing it will be apparent that I have thus provided a simply constructed and consequently inexpensive device which is very easy to operate, which is easy to keep clean, which will be highly efficient in use and which will perform all the functions for which it is intended.

While I have shown and described the perferred embodiment of my invention it is of course to be understood that I reserve the right to make such changes in the form, construction and arrangement of parts as will not depart from the spirit of the invention or the scope of the subjoined claim.

Having thus described my invention I claim;

A device of the character described comprising a cylinderical receptacle having a handle, a cover for the receptacle and said cover being provided with a slot extending inwardly from the side edge thereof, a false semi-circular bottom arranged above the lower edge of the receptacle and having formed therein a depression disposed adjacent one side thereof, a bracket detachably secured to the receptacle diametrically opposite the handle and having its upper end angularly disposed toward the receptacle, said angle end being provided with a slot adapted to register with the slot in the cover, a spindle arranged at an inclination and finding bearings in the respective slots and the depression respectively, beater arms carried by the inclined end of the spindle, means for locking the spindle for operative position in the slot of the angle bent end and means carried by the bracket for rotating the spindle.

In testimony whereof I affix my signature.

LENA SAUER.